United States Patent
Hung (10) Patent No.: US 10,393,586 B2
(45) Date of Patent: Aug. 27, 2019

(54) SPECTROMETER AND MANUFACTURING METHOD THEREOF

(71) Applicant: OTO PHOTONICS INC., Hsinchu (TW)

(72) Inventor: Chien-Hsiang Hung, Taipei (TW)

(73) Assignee: OTO PHOTONICS INC., Hsinchu (TW)

( * ) Notice: Subject to any disclaimer, the term of this patent is extended or adjusted under 35 U.S.C. 154(b) by 0 days.

(21) Appl. No.: 15/360,962

(22) Filed: Nov. 23, 2016

(65) Prior Publication Data

US 2018/0017443 A1   Jan. 18, 2018

(30) Foreign Application Priority Data

Jul. 12, 2016   (TW) .............................. 105121861 A (51) Int. Cl.
| | |
|---|---|
| *G01J 3/18* | (2006.01) |
| *G01J 3/02* | (2006.01) |
| *G01J 3/28* | (2006.01) |
| *G01J 3/20* | (2006.01) |

(52) U.S. Cl.
CPC ............ *G01J 3/1895* (2013.01); *G01J 3/021* (2013.01); *G01J 3/0259* (2013.01); *G01J 3/20* (2013.01); *G01J 3/28* (2013.01); *G01J 2003/1842* (2013.01)

(58) Field of Classification Search
CPC .. G01J 3/1895; G01J 3/021; G01J 3/28; G01J 2003/1842; G02B 6/0033
See application file for complete search history.

(56) References Cited

U.S. PATENT DOCUMENTS

| | | |
|---|---|---|
| 4,274,706 A | 6/1981 | Tangonan |
| 4,744,618 A | 5/1988 | Mahlein |
| 5,289,002 A | 2/1994 | Tarn |
| 5,424,826 A | 6/1995 | Kinney |
| 5,550,375 A | 8/1996 | Peters et al. |
| 5,734,165 A | 3/1998 | Unal et al. |
| 5,812,262 A | 9/1998 | Ridyard et al. |

(Continued)

FOREIGN PATENT DOCUMENTS

| | | |
|---|---|---|
| CN | 1315656 | 10/2001 |
| CN | 1719231 | 1/2006 |

(Continued)

*Primary Examiner* — Violeta A Prieto
(74) *Attorney, Agent, or Firm* — Cheng-Ju Chiang (57) ABSTRACT

A spectrometer includes an input unit for receiving an optical signal, a diffraction grating disposed on the transmission path of the optical signal for dispersing the optical signal into a plurality of spectral rays, an image sensor disposed on the transmission path of at least a portion of the spectral rays, and a waveguide device. A waveguide space is formed between the first and second reflective surfaces of the waveguide device. The optical signal is transmitted from the input unit to the diffraction grating via the waveguide space. The portion of the spectral rays is transmitted to the image sensor via the waveguide space. At least one opening is formed on the waveguide device, and is substantially parallel to the first and/or second reflective surface. A portion of the spectral rays and/or the optical signal diffuses from the opening out of the waveguide space without reaching the image sensor.

9 Claims, 9 Drawing Sheets

(56) References Cited

U.S. PATENT DOCUMENTS

| | | |
|---|---|---|
| 6,037,655 A | 3/2000 | Philbrick et al. |
| 6,839,135 B2 | 1/2005 | Hamm et al. |
| 7,092,090 B2 | 8/2006 | Shimizu et al. |
| 7,476,852 B2 | 1/2009 | Bonne et al. |
| 7,502,109 B2 | 3/2009 | Bonne et al. |
| 7,518,380 B2 | 4/2009 | Bonne et al. |
| 7,578,167 B2 | 8/2009 | Bonne et al. |
| 7,654,129 B2 | 2/2010 | Bonne et al. |
| 7,817,274 B2 | 10/2010 | Zhang |
| 8,508,731 B2 * | 8/2013 | Ko .......... G01J 3/02 356/326 |
| 9,122,014 B2 * | 9/2015 | Ko .......... G01J 3/02 |
| 9,146,155 B2 * | 9/2015 | Ko .......... G01J 3/02 |
| 2001/0030746 A1 | 10/2001 | Hamm et al. |
| 2003/0112433 A1 | 6/2003 | Youn et al. |
| 2006/0263603 A1 | 11/2006 | Kondo et al. |
| 2006/0289809 A1 | 12/2006 | Bonne et al. |
| 2007/0028670 A1 | 2/2007 | Bonne et al. |
| 2007/0113642 A1 | 5/2007 | Bonne et al. |
| 2007/0274867 A1 | 11/2007 | Iwamoto et al. |
| 2008/0163674 A1 | 7/2008 | Bonne et al. |
| 2008/0225392 A1 | 9/2008 | Ko |
| 2009/0034080 A1 | 2/2009 | Ko |
| 2009/0041391 A1 | 2/2009 | Wang et al. |
| 2009/0148969 A1 | 6/2009 | Derderian et al. |
| 2009/0184724 A1 | 7/2009 | Bonne et al. |
| 2011/0080584 A1 * | 4/2011 | Ko .......... G01J 3/02 356/328 |
| 2011/0170099 A1 | 7/2011 | Ko |
| 2013/0294727 A1 | 11/2013 | Ko |
| 2016/0349111 A1 * | 12/2016 | Hung .......... G01J 3/18 |

FOREIGN PATENT DOCUMENTS

| | | |
|---|---|---|
| CN | 101263372 | 9/2008 |
| CN | 101364261 | 2/2009 |
| CN | 100468045 | 3/2009 |
| CN | 101382666 | 3/2009 |
| CN | 102741716 | 10/2012 |
| CN | 102869963 | 1/2013 |
| DE | 19528919 | 2/1997 |
| DE | 19602584 | 7/1997 |
| DE | 20006642 | 8/2000 |
| EP | 0282878 | 6/1995 |
| EP | 0758079 | 2/1997 |
| EP | 0876589 | 11/1998 |
| EP | 1882167 | 1/2008 |
| JP | H04262282 | 9/1992 |
| JP | H09119866 | 5/1997 |
| JP | 2008541134 | 11/2008 |
| TW | 200907309 | 2/2009 |
| TW | 200908310 | 2/2009 |
| TW | M370071 | 12/2009 |
| TW | I325492 | 6/2010 |
| TW | 201137328 | 11/2011 |
| TW | 201142255 | 12/2011 |
| WO | 9727460 | 7/1997 |
| WO | 2007050123 | 5/2007 |
| WO | 2011082695 | 7/2011 |
| WO | 2011137584 | 11/2011 |

* cited by examiner

FIG. 5 determining a plurality of parameters of the input unit, the diffraction grating, the image sensor and the waveguide device of the spectrometer by a simulation program ~S110 configuring the input unit, the diffraction grating, the image sensor and the waveguide device according to the parameters ~S120

FIG. 6

SPECTROMETER AND MANUFACTURING METHOD THEREOF

FIELD OF THE INVENTION

The present invention relates to an optical apparatus and a manufacturing method thereof, and more particularly to a spectrometer and a manufacturing method thereof.

BACKGROUND OF THE INVENTION

Spectrometer is an non-destructive detection equipment for characterization of substance composition and properties. In a spectral measurement, lights would be irradiated onto the target substance, and internal structure of the substance would result in reflection, adsorption or permission of the lights of different wavelengths. Upon reception of the lights reflected by or passed through the substance by the spectrometer, a spectrum of the substance would be obtained. As every substance has a distinct spectral feature, composition and properties of different substances may be characterized.

To reduce light loss, waveguide device is usually adopted to guide travel of lights in the internal passages of the spectrometer to allow the image sensor to detect the spectrum generated by the diffraction grating. Conventionally, the image sensor is disposed adjacent to the waveguide device to minimize light loss. However, inventors of the present invention observed that such disposition of the image sensor is associated with tailing effect that could reduce spectral resolution and affect accuracy of the resulting spectral data, such as peak intensities and wavelengths.

The tailing effect is caused by astigmatism of the grating, and is discussed in *Diffraction Grating Handbook, 6th edition* authored by Christopher Palmer of Newport Corporation (specifically, in first paragraph in page 90, FIGS. 7-3 in page 94, third paragraph in page 111, and FIGS. 8-1b in page 112). When a cylindrical grating is adopted as the concave grating, light beams could be focused only along the radial plane (that is, the tangential plane, or essentially the horizontal plane) but not along the vertical plane (that is, the sagittal plane). As such, when lights incident the grating at an oblique angle, the tangential focus projected from the waveguide device would exhibit a moon-like shape. Such phenomenon has been referred to as the tailing effect. Unlike a spot focus, the moon-shaped focus would reduce spectral resolution. Moreover, being detectable by pixels of the corresponding wavelength surrounding those of the image sensor, the moon-shaped focus would also result in inaccuracy of the acquired spectral data, such as peak intensities and wavelengths.

BRIEF SUMMARY OF THE INVENTION

Therefore, the present invention provides a spectrometer that improves the reduced resolution caused by astigmatism of the diffraction grating.

The present invention also provides a manufacturing method of the aforementioned spectrometer.

According to an embodiment of the present invention, a spectrometer includes a light input, a diffraction grating, an image sensor and a waveguide. The light input for receiving an optical signal. The diffraction grating is disposed on a transmission path of the optical signal from the light input for dispersing the optical signal into a plurality of spectral rays. The image sensor is disposed on a transmission path of at least a portion of the spectral rays. The waveguide includes a first reflective surface and a second reflective surface. A waveguide space is formed between the first reflective surface and the second reflective surface. The optical signal is transmitted from the light input to the diffraction grating via the waveguide space. The at least a portion of the spectral rays is transmitted to the image sensor via the waveguide space. At least one opening is formed on the waveguide. The opening is substantially parallel to at least one of the first reflective surface and the second reflective surface. A portion of at least one of the spectral rays and the optical signal diffuses from the opening out of the waveguide space without reaching the image sensor.

According to another embodiment of the present invention, a manufacturing method of a spectrometer includes: determining a plurality of parameters of a light input, a diffraction grating, an image sensor and a waveguide of the spectrometer by a simulation program; and configuring the light input, the diffraction grating, the image sensor and the waveguide according to the parameters. The light input is for receiving an optical signal. The diffraction grating is disposed on a transmission path of an optical signal from the light input for dispersing the optical signal into a plurality of spectral rays. The image sensor is disposed on a transmission path of at least a portion of the spectral rays. The waveguide includes a first reflective surface and a second reflective surface. A waveguide space is formed between the first reflective surface and the second reflective surface. The optical signal is transmitted from the light input to the diffraction grating via the waveguide space. The at least a portion of the spectral rays is transmitted to the image sensor via the waveguide space. At least one opening is formed on the waveguide. The opening is substantially parallel to at least one of the first reflective surface and the second reflective surface. A portion of at least one of the spectral rays and the optical signal diffuses from the opening out of the waveguide space without reaching the image sensor. The parameters determined by the simulation program include a width of the opening along a direction of light transmission.

In sum, the spectrometer and the manufacturing method according to the embodiments of the present invention form at least one opening on the waveguide for diffusing at least one of the spectral rays and optical signals having large divergence angles away from the image sensor. Consequently, portions of the spectral rays that would cause tailing effect are diffused from the opening and away from the image sensor. Therefore, spectrum detected by the spectrometer of the present invention is accurate and high in spectral resolution.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE INVENTION

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
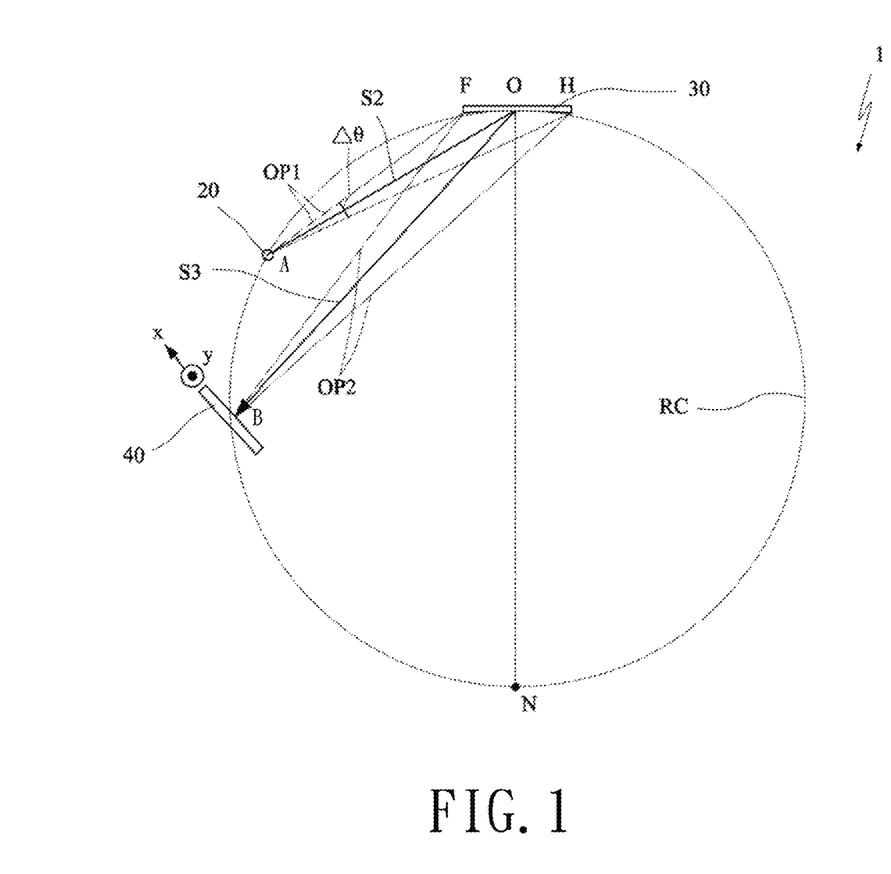
FIG. 1 is a top view of a spectrometer according to an embodiment of the present invention.
Figure 2A:
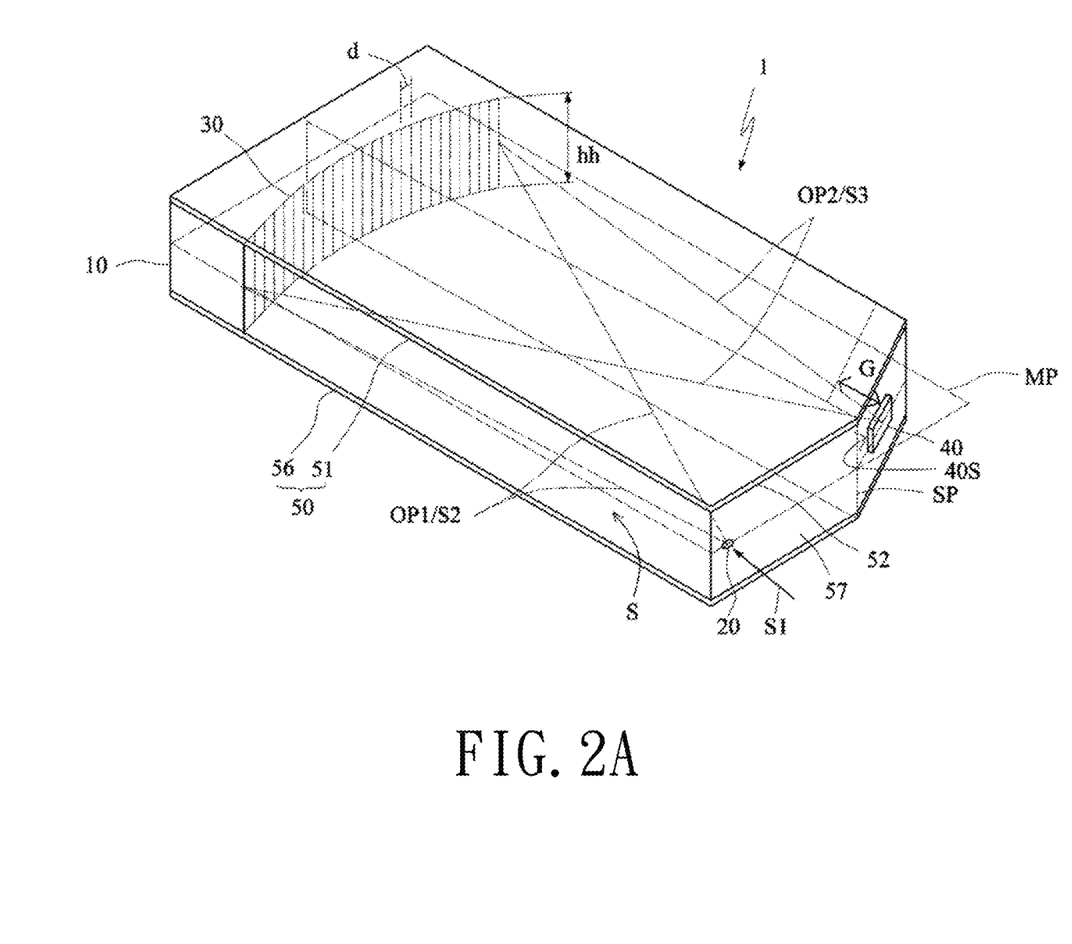
FIG. 2A is a perspective view of the spectrometer according to the embodiment of the present invention.

Referring now to FIG. 1 and FIG. 2A showing the top view and perspective view of a spectrometer according to an embodiment of the present invention. As shown in FIGS. 1 and 2A, spectrometer 1 according to an embodiment of the present invention includes a light input 20, a diffraction grating 30, an image sensor 40 and a waveguide 50.

In the present embodiment, the light input 20, the diffraction grating 30, the image sensor 40 and the waveguide 50 are all disposed in a main body 10; and as shown in FIG. 1, the light input 20, the diffraction grating 30 and the image sensor 40 are disposed along a Rolland circle RC. The main body 10 may be a housing of the spectrometer 1 or a frame for mounting the light input 20, the diffraction grating 30, the image sensor 40 and the waveguide 50.

The diffraction grating 30 includes two ends F and H. The tangential plane NIP is defined as the wavelength distribution plane of the diffraction grating 30. The light input 20 at point A and the image sensor 40 at point B are disposed on the same plane MP. The concave of the diffraction grating 30 is a cylindrical surface with grooves distributed thereon. Line N-O is the diameter of the Rolland circle RC, and equals the radius of curvature of the concave of the diffraction grating 30. Points O and N are located along the Rolland circle RC, and A is the horizontal divergence angle of incident light beams.

The light input 20 typically includes a slit and is disposed at the housing 10. The light input 20 is adopted for receiving an optical signal S1, which is referred to as optical signal S2 after passing through the slit. The optical signal S2 travels along a first optical path OP1. The optical signal S1 may be light provided from an optical fiber or the external environment or that reflected from or passed through a target object.

The diffraction grating 30 having a height of hh is disposed in the housing 10 and on the transmission path of the optical signal S2 from the light input 20. The diffraction grating 30 is adapted for receiving the optical signal S2 and dispersing the optical signal S2 into a plurality of spectral rays S3. The image sensor 40 is disposed on the transmission path of at least a portion of the spectral rays S3. In the present embodiment, the spectral rays S3 includes specific spectral rays that travel along a plurality of second optical paths OP2 respectively. The diffraction grating 30 of the present embodiment is a reflective concave grating and is adapted to focus at least a portion of the spectral rays S3 onto the sensing surface 40S of the image sensor 40, as shown in FIG. 2B.

In the present embodiment, the spectral rays S3 detected by the image sensor 40 may be, but are not limited to, negative third order diffractive rays. In other embodiments, the spectral rays detected by the image sensor 40 may be diffractive rays of other orders.

Figure 2B:
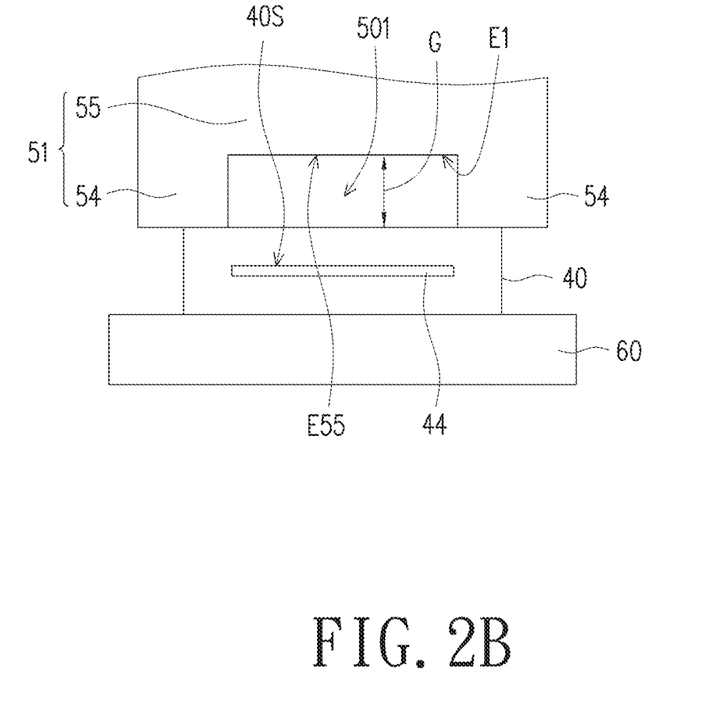
FIG. 2B is a top view of a waveguide and an image sensor of the spectrometer in FIG. 2A.
Figure 2C:
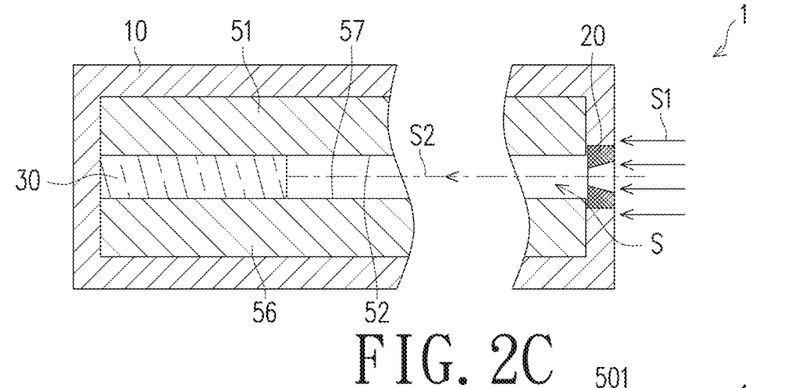
FIGS. 2C and 2D show the directions of light incident and exit along the cross-section of the spectrometer according to the embodiment of the present invention.
Figure 2D:
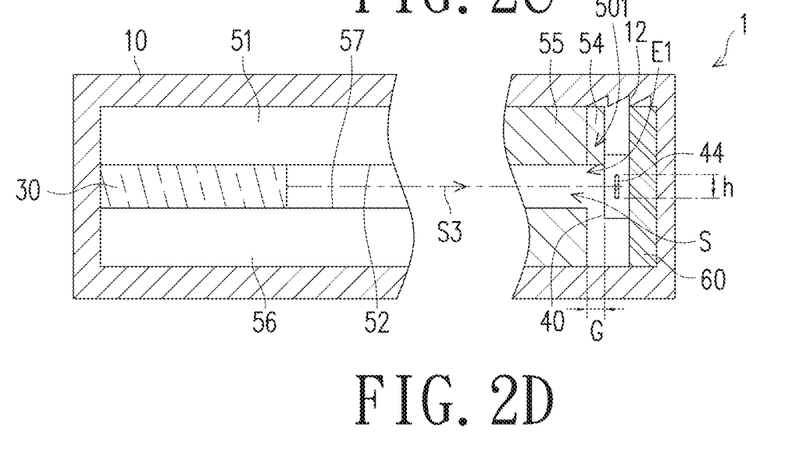

Referring now to FIGS. 2B through 2D. The waveguide 50 is disposed at the housing 10 and includes a first reflective surface 52 and a second reflective surface 57 opposite to the first reflective surface 52. The waveguide 50 may guide the optical signal S2 and the spectral rays S3 by limiting the first optical path OP1 and the second optical path OP2 to the waveguide space S formed between the first reflective surface 52 and the second reflective surface 57. The optical signal S2 is transmitted from the light input 20 to the diffraction grating 30 through the waveguide space S, and at least one specific spectral ray S3 is transmitted through the waveguide space S to the image sensor 40. In the present embodiment, the at least one specific spectral ray S3 is transmitted to an end E1 of the waveguide space S, and exits from the end E1.

The image sensor 40 is disposed at the housing 10 and is adapted for receiving the spectral rays S3. The image sensor 40 includes at least one sensing member 44 having a sensing surface 40S. The sensing member 44 of the image sensor 40 may be disposed at the focal point of at least one of the spectral rays S3 for sensing the (specific) spectral rays S3 and transmitting the received spectral rays S3 to a computer or processor for processing. The image sensor 40 may be disposed on and electrically connected to a circuit board 60.

In the present embodiment, the waveguide 50 includes at least one opening 501 that is substantially parallel to at least one of the first reflective surface 52 and the second reflective surface 57. A portion of at least one of the spectral rays S3 and the optical signal S2 (or a portion of the spectral ray S3 as in the present embodiment) would exit the waveguide space S from the opening 501 and thus not incident the image sensor 40. In the present embodiment, the waveguide device 50 further includes at least one extension 54; for example, FIG. 2B exemplarily illustrates two extensions 54. The extension 54 extends from the end E1 of the waveguide space S toward the image sensor 40 and therefore defines the opening 501 between the end E1 and the image sensor 40. In the present embodiment, the extension 54 extends to and abuts the image sensor 40, and the width G of the opening 501 (or a gap) along the direction of optical wave transmission is the distance between the end E1 and the image sensor 40. When the opening 501 is disposed between the diffraction grating 30 and the image sensor 40, the direction of optical wave transmission is the direction of transmission of optical waves of the spectral rays S3 within the waveguide space S, and is defined as the direction from the center of the diffraction grating 30 to the center of the image sensor 40. Likewise, when the opening 501 is disposed between the light input 20 and the diffraction grating 30, the direction of optical wave transmission is the direction of transmission of optical waves of the optical signal S2 within the waveguide space S, and is defined as the direction from the center of the light input 20 to the center of the diffraction grating 30. In another embodiment, the extension 54 may abut against a component connected to the image sensor 40 so as to form the opening 501 between the end E1 and the image sensor 40. The component connected to the image sensor 40 may be a base, a pad, the main body 10 or the circuit board 60.

In the present embodiment, the waveguide 50 includes a first reflective mirror 51 and a second reflective mirror 56. The first reflective mirror 51 includes a waveguide portion 55 and the extension 54 connected to the waveguide portion 55. The waveguide portion 55 includes an light exit end E55 that extends towards the sensing surface 40S and defines the end E1 of the waveguide space S. The first reflective mirror 51 include the first reflective surface 52, and the second reflective mirror 56 includes the second reflective surface 57 that faces the first reflective surface 52.

Referring now to FIGS. 2C and 2D, which illustrate the directions of light incident and exit along the cross-section of the spectrometer according to the embodiment of the present invention. When a plurality of sensing members 44 are adopted, the sensing members 44 may be aligned along the direction perpendicular to the rendering plane of FIG. 2D (that is, along the horizontal direction of FIG. 2B) or be arranged into an array. When aligned, the sensing members 44 may function in conjunction with a diffraction grating with freeform surfaces as such diffraction grating could focus the spectral rays S3 onto a straight line. In other embodiments, the diffraction grating 30 may be the grating disclosed in U.S. Pat. No. 9,146,155.

Further, as shown in FIG. 2D, the width G of the opening 501 is associated with the width h of the sensing surface 40S. The width h may be substantially perpendicular to the first reflective surface 52 and the second reflective surface 57.

The width G may be obtained by theoretical derivation and/or software simulation as exemplified in the following.

The ray tracing software TracePro is adopted to simulate ray tracing of a slab-waveguide micro-grating (SWMG) system. TracePro processes light beams diffracted by a grating according to diffraction efficiencies provided by the user. Strict calculation of the diffraction efficiency of the grating may be performed by the PCGrate software.

As shown in FIG. 1, the center of the sensing surface 40S of the image sensor 40 is disposed at the focal point on the Rolland circle RC, and the plane of the sensing surface 40S is perpendicular to the primary light beams transmitted from point O. In other words, the sensing surface 40S of the image sensor 40 is disposed on the focal plane. In the present embodiment, a sensor having an area of 1.50 mm (horizontal length)×0.90 mm (vertical length) is adopted for simulation. In software simulation, the width G and the divergence half angle of incident light beams along the vertical or sagittal plane SP as shown in FIG. 2A may vary without altering the location of the image sensor 40. Meanwhile, the divergence half angle of incident light beams along the horizontal or tangential plane is fixed at 12° in all simulations.

Figure 3A:
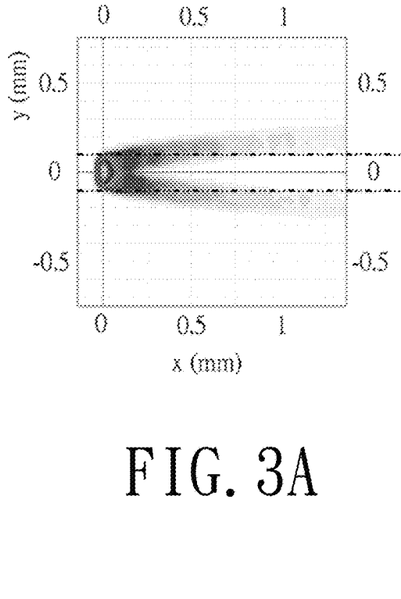
FIGS. 3A through 3C show the simulated distribution of diffracted images on the sensing surface of the image sensor.
Figure 3B:
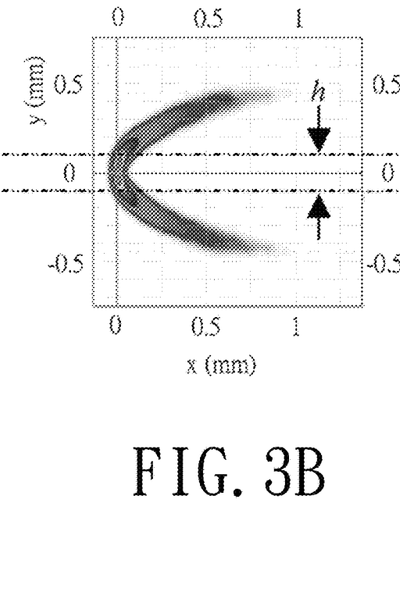
Figure 3C:
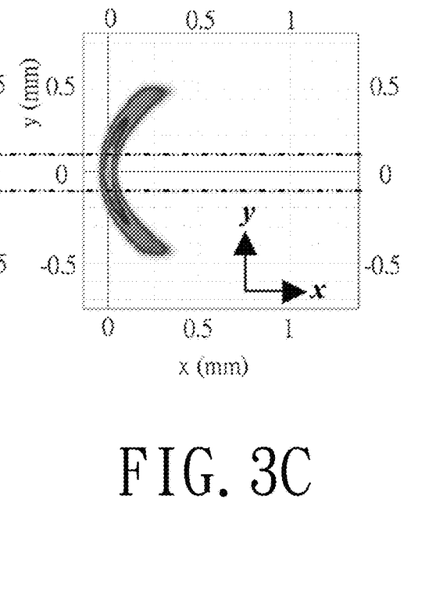

Referring now to FIGS. 3A through 3C, which illustrate the simulated distribution of diffracted images on the sensing surface of the image sensor. The widths G in FIGS. 3A-3C are 1 mm, 3 mm and 5 mm, respectively. The diffracted images as shown are distorted into two elongated portions and form a moon-shaped distribution. The intensity distribution of the widest simulated width G (=5 mm) along the y-axis is larger than the width h of the simulated sensing surface 40S. Consequently, the distribution along the y-axis shown in FIG. 3C is truncated and is not entirely captured by the image sensor 40 as shown in FIGS. 3A and 3B. Further, as shown in FIGS. 3A through 3C, the bending of the moon shaped image decreases with the increase in width G; as the bending decreases, the two elongated portions would be undetected by the image sensor 40, and hence the spectrum detected by the image sensor 40 would be less affected by the tailing effect (or the effect caused by astigmatism). However, FIGS. 3A-3C also demonstrate that light energy received by the sensing surface 40S within the width h is reduced with the increase in width G and decrease in bending of the moon shaped image, thereby reducing the spectral signals. Therefore, the width G shall be adjusted according to actual needs.

In FIGS. 3A-3C, h represents vertical pixels (or the width h of the sensing surface 40S) and may be 200 μm, which equals the width h of the sensing surface 40S of commercially available image sensors 40. Other commercially available image sensors have vertical pixels of 50 μm, 500 μm or other widths. Wider vertical pixels may be adopted for receiving more optical signals on the linear image sensor 40. However, as shown in FIGS. 3A-3C, wider vertical pixels would result in inclusion of more elongated portions of the moon shaped image and therefore inaccurate wavelength reads. Consequently, in addition to choosing a suitable width G, the width h shall also be adjusted according to actual needs.

In the embodiments of the present invention, a program is designed for eliminating tailing effect from spectral data. The program includes the steps of (1) simulating by software the results resulted from different widths G; and (2) choosing the size of vertical pixels (that is, the width h) suitable for the linear image sensor. As shown in FIGS. 3A-3C, by allowing the synthesized focal image at a gap between the sensor plane and the waveguide edge to expand into a moon shaped distribution on the sensor plane and be disposed at y=0 along the vertical pixel height (or the width h), the linear image sensor would capture only the central portion of the moon shaped distribution. As a result, tailing effect could be completely eliminated by such G-h adjustment mechanism according to the embodiments of the present invention.

Therefore, the user may easily obtain or adjust the width G according to the parameters of the image sensor to effectively eliminate the negative impact of tailing effect. While design standards of a conventional spectrometer require the slab waveguide to be closely abutting the image sensor to reduce light loss, the embodiments of the present invention allow image sensors to acquire good spectral data without conforming to the conventional design standards.

While Rolland circle and diffraction grating with fixed pitch d are exemplified in the embodiments of the present invention as they are the fundament of the diffraction theory, it is to be understood that the embodiments of the present invention may also adopt non-Rolland circle and diffraction grating with unfixed pitch, and that the light input 20 and the image sensor 40 need not be disposed along the Rolland circle RC as the contour of the diffraction grating may include straight line, arc or other curved surface.

In the spectrometer 1 of the present embodiment, the opening 501 between the end E1 and the image sensor 40 allows the portion of the spectral rays S3 that causes the tailing effect (that is, the portion with larger divergence angle) to diverge from the end E1 of the waveguide space S toward a direction away from the sensing surface 40S, so that spectrum detected by the spectrometer 1 could be less affected by the tailing effect.

In the present embodiment, the opening 501 formed adjacent to the extension 54 and the light exit end E55 is a gap for light diffusion, and is disposed on the plane extending from the first reflective surface 52 of the first reflective mirror 51 on which the light transmission path (for example, the second optical paths OP2 shown in FIG. 1) orthographically projects. In the present embodiment, two extensions 54 are exemplarily illustrated in FIG. 2B. However, other embodiments may adopt only one extension 54, for example the extension 54 on the right in FIG. 2B, as long as the width G is maintained.

In the present embodiment, the width G of the opening 501 would affect the moon shaped distribution of at least partial of the spectral rays; the width h of the sensing surface 40S along the direction parallel to the normal line of the first reflective surface 52 would affect the integral range of the image sensor 40; and the divergence half angle of the optical signal S2, which incidents the waveguide space S from the light input 20, along the direction parallel to the normal line of the first reflective surface 52 (or the divergence half angle of light beams along the sagittal plane) would affect the expansion of the moon shape. By the aforementioned simulation program associating the width G of the opening 501 along the direction of light transmission, the divergence half angle, and the width h of the sensing surface 40S along the direction parallel to the normal line of the first reflective surface 52, the width G of the opening 501 allows a portion of the spectral rays to diffuse along the direction parallel to the normal line of the first reflective surface 52, so that the two elongated portions of the moon shaped distribution derived from the divergence half angle would substantially fall out of the integral range of the image sensor 40.

In the present embodiment, the width G of the opening 501 is larger than or equal to 1 mm. For example, the width G of the opening 501 in one embodiment falls within the range of 1 mm to 5 mm.

In the present embodiment, the first reflective mirror 51 includes the extension 54 that abuts the image sensor 40 whereas the second reflective mirror 56 does not abut the image sensor 40. However, another embodiment may be that the second reflective mirror 56 has a light exit end (for example, the light exit end E55) and an extension abutting the image sensor 40 (for example, the extension 54), and that the first reflective mirror 51 neither abut the image sensor 40 and nor have the extension 54. Further, yet another embodiment may be that each of the first reflective mirror 51 and the second reflective mirror 56 has the light exit end E55 and the extension 54 that abuts the image sensor 40. Likewise, in the present embodiment, only the first reflective mirror 51, but not the second reflective mirror 56, has the opening 501. However, other embodiments may be that only the second reflective mirror 56, but not the first reflective mirror 51, has the opening 501; or that each of the first reflective mirror 51 and the second reflective mirror 56 has the opening 501.

In the present embodiment, the spectrometer 1 further includes a light capturing structure 12 (as illustrated in FIG. 2D) disposed outside of the waveguide space S for absorbing light diffused from the opening 501. The light capturing structure 12 may be a serrated surface structure or other suitable non-planar surface structure on the main body 10 (or the housing of the spectrometer), and may be plated with a light absorption layer. When light diffused from the opening 501 incidents the light capturing structure 12, the serrated surface structure would repeatedly reflect the light toward the bottom of the concaves of the serrated structure, therefore increasing the amount of light absorbed by the light absorption layer. Consequently, the light capturing structure 12 may effectively absorb diffused light from the opening 501 and reduce the chance of such diffused light becoming stray light of the image sensor 40. In another embodiment, instead of adopting the light capturing structure 12 for light absorption, the inner surface of the main body 10 may be plated with a light absorption layer for absorbing light diffused from the opening 501.

Figure 4A:
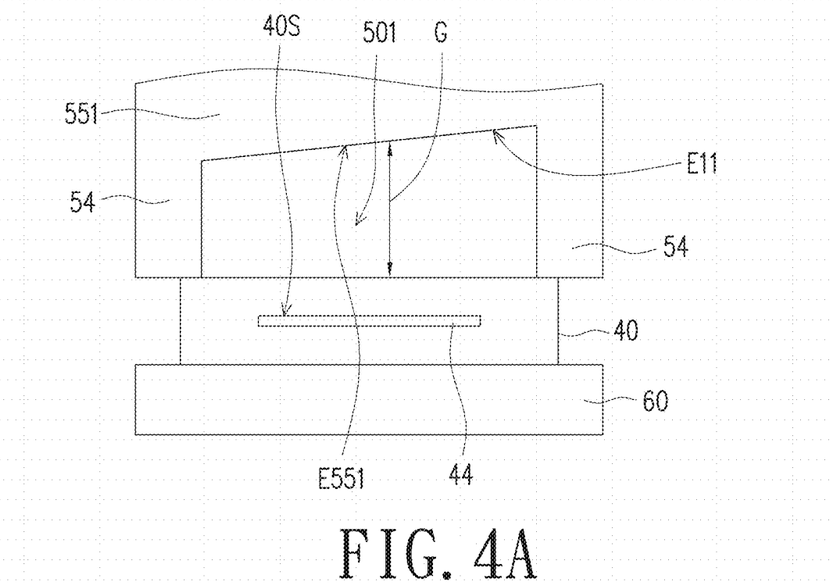
FIGS. 4A through 4D illustrate four variations of the opening in FIG. 2B.

Referring now to FIGS. 4A through 4D, which illustrate four variations of the opening in FIG. 2B. As shown in FIG. 4A, the distances between the image sensor 40 and a plurality of spots on the light exit end E551 of the waveguide portion 551 are not completely identical; that is, the width G of the opening is not constant. In the present embodiment, the edge of the light exit end E551 is unparallel to the sensing surface 40S, hence defining an end E11 of the waveguide space that tilts in respect to the sensing surface 40S. In another embodiment, the edge of the light exit end E551 may be, but is not limited to, a serrated edge, a stepped edge, a segmented edge or other non-smooth edge. Additionally, the width G of the opening 501 may also be designed according to various focal points of lights of different wavelengths.

Figure 4B:
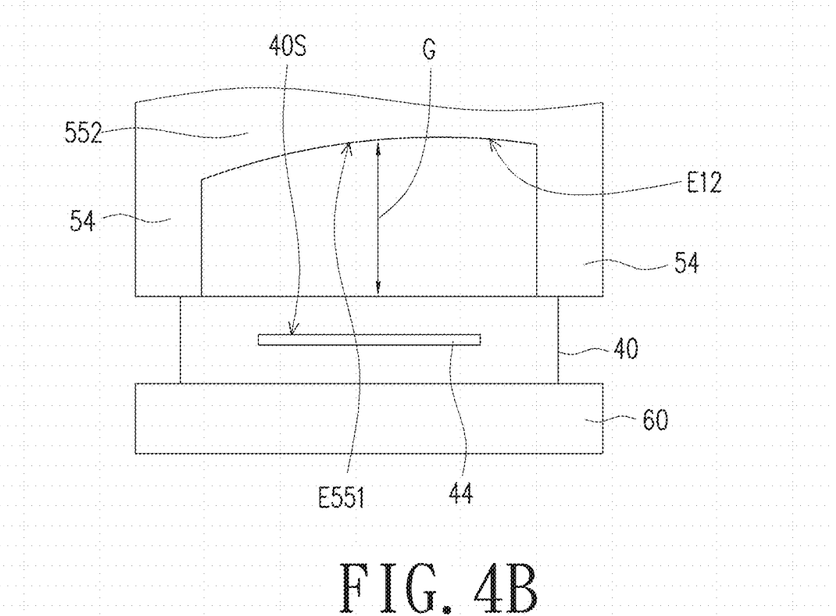

Further, in another embodiment as illustrated in FIG. 4B, the edge of the light exit end E552 of the waveguide portion 552 may be a curved edge that defines a curved end E12 of the waveguide space. As different wavelengths result in varying resolutions on the sensing surface 40S, the design of the ends E11 and E12 provides more flexibility; specifically, the end E11 may be disposed closer to the sensing surface 40S to increase photosensitivity intensity or away from the sensing surface 40S to improve resolution.

As lights with shorter wavelengths have higher resolution, portions of the end E11 corresponding to short wavelengths may be disposed closer to the sensing surface 40S; alternatively, those corresponding to long wavelengths may be disposed farther from the sensing surface 40S. In other embodiments, the width G may be adjusted according to the targeted wavelengths.

Figure 4C:
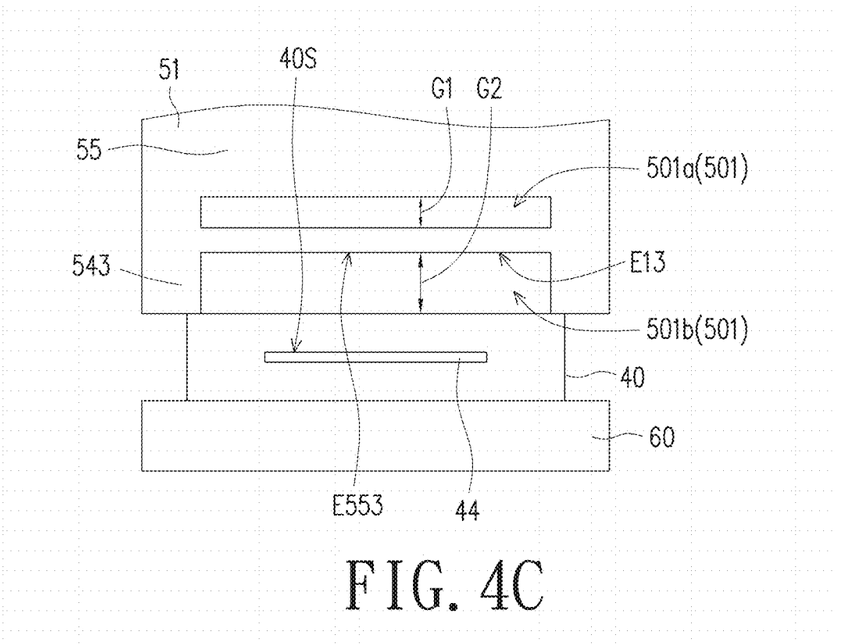

Referring now to FIG. 4C. In the embodiment as illustrated in FIG. 4C, the first reflective mirror 51 may include a plurality of openings 501, for example opening 501a and opening 501b. The opening 501a is closed opening disposed between the diffraction grating 30 and the image sensor 40, and the opening 501b is formed by the extension 543 and the light exit end E553 of the waveguide portion 55. The end E13 of the waveguide space is defined by the light exit end E553. In the present embodiment, the width G1 of the opening 501a along the direction of light transmission may be identical to or distinct from the width G2 of the opening 501b along the direction of light transmission. The wider the widths G1 and G2 are, the more the lights having smaller divergence angles would diffuse from the opening 501. For example, given that the width G2 is larger the width G1, lights having divergence angles of 70-90° may diffuse from the opening 501a and those having divergence angles of 60-90° may diffuse from the opening 501b. In other embodiments, a plurality of closed openings 501a may be arranged along the direction of light transmission. In another embodiment, the opening 501 (for example, the opening 501a) may tilt in respect to the sensing surface 40S of the image sensor 40 along the extension direction parallel to at least one of the first reflective surface 52 and the second reflective surface 57.

Figure 4D:
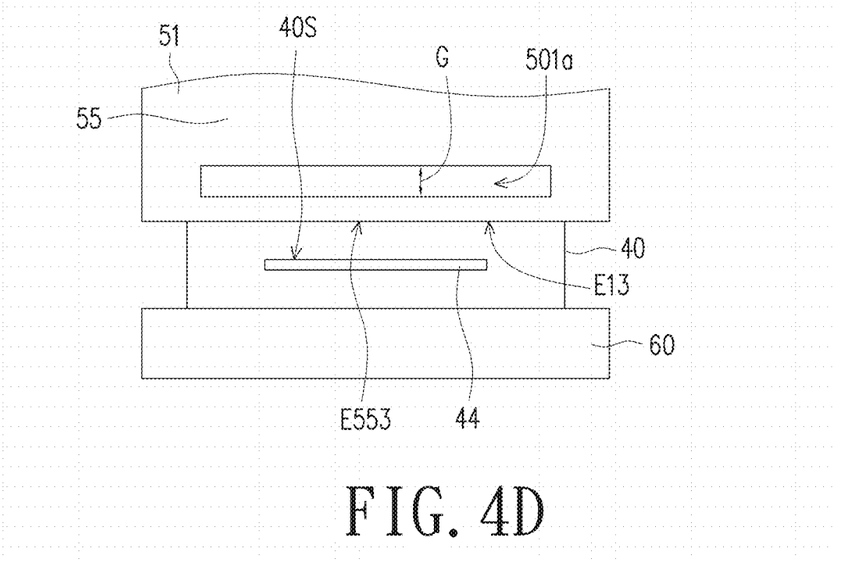

Referring now to FIG. 4D. As compared to the previous embodiment, the first reflective mirror 51 of the present embodiment only has the closed opening 501a but not the open opening 501b illustrated in FIG. 4C. The end E13 of the waveguide space S is defined by the light exit end E553, and directly abuts the image sensor 40.

Figure 5:
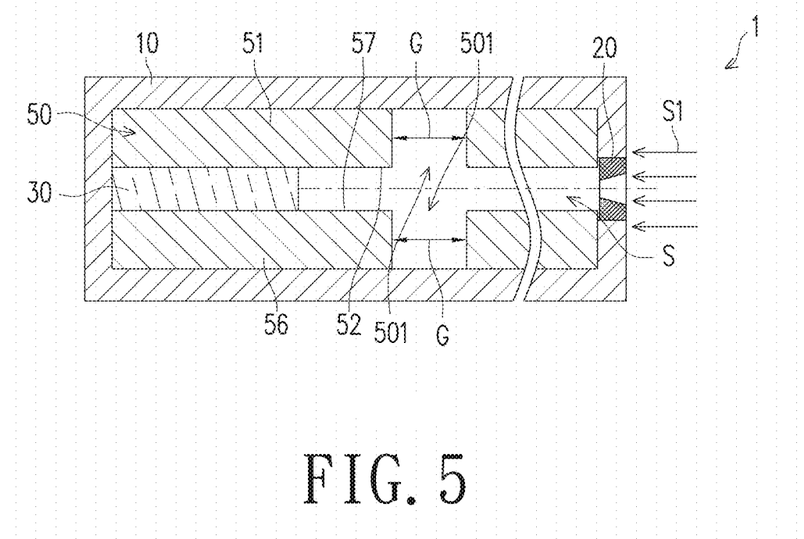
FIG. 5 shows the directions of light incident along a cross-sectional view of the spectrometer according to another embodiment of the present invention.

Referring now to FIG. 5, which illustrates the directions of light incident along a cross-sectional view of the spectrometer according to another embodiment of the present invention. As shown in FIG. 5, the opening 501 of the waveguide 50 is disposed between the light input 20 and the diffraction grating 30 for allowing optical signals S2 with large divergence angles to diffuse therefrom, therefore preventing lights that cause the tailing effect from reaching the image sensor 40. In the present embodiment, both of the first reflective mirror 51 and the second reflective mirror 56 have the opening 501. However, other embodiments may have either the first reflective mirror 51 or the second reflective mirror 56 disposed with the opening 501. Further, in yet another embodiment, the opening 501 may be formed between the light input 20 and the diffraction grating 30 and between the diffraction grating 30 and the image sensor 40 of the waveguide 50. The width G of the opening 501 along the direction of light transmission allows a portion of the optical signals S2 and the spectral rays S3 to diffuse along the direction parallel to the normal line of the first reflective surface 52 or the second reflective surface 57. Moreover, in still another embodiment, the opening 501 may be disposed at an end of the waveguide 50 facing the light input 20; in other words, an extension similar to the extension 54 illustrated in FIG. 2B is formed at the end of the waveguide 50 facing the light input 20, so as to form an open opening 501.

Figure 6:
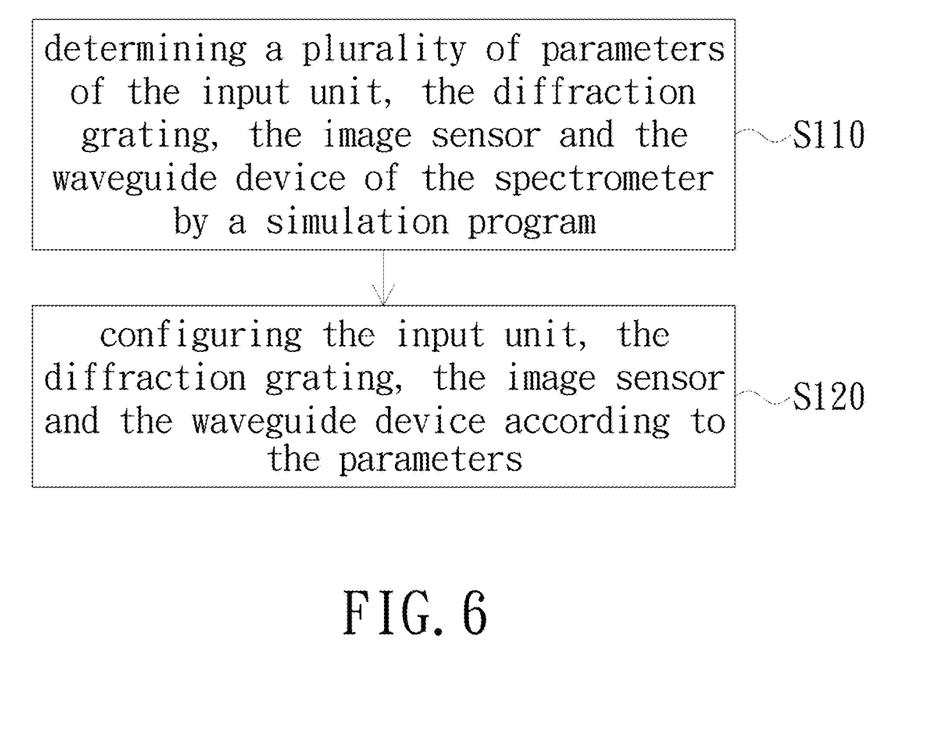
FIG. 6 is a flowchart of the manufacturing method of the spectrometer according to an embodiment of the present invention.

Referring now to FIGS. 1, 2A-2D and 6. Specifically, FIG. 6 is a flowchart of the manufacturing method of the spectrometer according to an embodiment of the present invention. The manufacturing method of the present embodiment may be adopted to manufacture the spectrometer 1 as illustrated in FIGS. 2A-2D or the spectrometers in other embodiments. As exemplified by the spectrometer 1 in FIGS. 2A-2D, the manufacturing method of the present embodiment includes the following steps. First, performing step S110: determining a plurality of parameters of the light input 20, the diffraction grating 30, the image sensor 40 and the waveguide 50 of the spectrometer 1 by the aforementioned simulation program. Thereafter, performing step S120: configuring the light input 20, the diffraction grating 30, the image sensor 40 and the waveguide 50 according to the parameters. For example, the light input 20, the diffraction grating 30 and the image sensor 40 may directly or indirectly abut the waveguide 50 according to the parameters. Structures, dispositions along the optical path, images generated in response to lights and beneficial effects of the light input 20, the diffraction grating 30, the image sensor 40 and the waveguide 50 have been described above in detail; therefore, redundant details are not to be repeated herein. Further, in the case where the image sensor 40 indirectly abuts the waveguide 50, a pad may be adopted to separately abut the waveguide 50 and the image sensor 40; the pad is removed after the waveguide 50 and the image sensor 40 are set in place, therefore spacing the image sensor 40 and the waveguide 50 apart for a distance. In another embodiment, the waveguide 50 or the image sensor 40 may be fixed to the housing.

The parameters determined by the simulation program include the width G of the opening 501 along the direction of light transmission. In an embodiment, the parameters further include the distance between the first reflective surface 52 and the second reflective surface 57. The bending of the moon shaped image decreases with the increase in such distance.

In the present embodiment, the light input 20 and the diffraction grating 30 abut the two positioning sides of the waveguide 50 (or the two positioning sides of the first reflective mirror 51). The two positioning sides, the opening 501 and the extension 54 may be fabricated by a microelectromechanical system (MEMS) process. The MEMS process could precisely fabricate positioning sides, opening 501 and extension 54 with low fabrication error, and is suitable for fabricating small waveguide 50 and closed openings on the first reflective mirror 51 and the second reflective mirror 56 with low production cost. In another embodiment, the two positioning sides and the extension 54 may be fabricated by computer numeric controlled machine tools.

As the MEMS process is capable of fabricating contours with high precision, precise and smooth positioning sides and extension 54 may be fabricated. Therefore, relative positions of the light input 20, the diffraction grating 30 and image sensor 40 when abutting the waveguide 50 are precisely determined, hence effectively improving the optical quality and precision of the spectrometer.

In the present embodiment, the simulation program determines a suitable width G of the opening 501 between the end E1 and the image sensor 40 by simulating various widths G on the condition that the image sensor 40 is positioned at the focus. In other words, giving that the location of the image sensor 40 is fixed, the length of the end E1 may be adjusted to generate various widths G of the opening 501. Alternatively, as illustrated in FIGS. 4C, 4D and 5, the opening 501 may be formed on at least one of the first reflective mirror 51 and the second reflective mirror 56.

The parameters determined by the simulation program may further include the width h of the sensing surface 40S along the direction parallel to the normal line of the first reflective surface 52. The simulation program determines a suitable width h of the image sensor 40 by simulating various widths h of the sensing surface 40S along the direction parallel to the normal line of the first reflective surface 52 on the condition that the image sensor 40 is positioned at the focus. In other words, the suitable correlation between the width G and the width h can be determined by the simulation program. Details on such process have been provided in the aforementioned embodiments.

The parameters determined by the simulation program may further include relative locations of all of the spectral components, distance between the lines on the grating, relative angles of the optical axis or optical paths, and shape of the end E1 of the waveguide space S. Therefore, the manufacturing method of the spectrometer of the present embodiment can produce spectrometers that are high in precision and optical efficiency and are unaffected by the tailing effect.

The extension 54 of the embodiment illustrated in FIGS. 2A-2D or the extensions of other embodiments may be fabricated by the MEMS process, and thus may precisely abut the image sensor 40. Further, the light exit end E55 of the first reflective mirror 51 may also be fabricated by the MEMS process, so that the end E1 of the waveguide space could be precisely positioned.

In sum, the spectrometer and the manufacturing method according to the embodiments of the present invention form at least one opening on the waveguide for diffusing sagittal light beams of at least one of the spectral rays and optical signals having large divergence angles away from the image sensor. Consequently, portions of the spectral rays that would cause tailing effect are diffused from the opening and away from the image sensor. In other words, if the opening is replaced by a reflective surface, sagittal light beams with large divergence angles would incident the image sensor and deteriorate the tailing effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A spectrometer, comprising:
   a light input for receiving an optical signal;
   a diffraction grating disposed on a transmission path of the optical signal from the light input for dispersing the optical signal into a plurality of spectral rays;
   an image sensor disposed on a transmission path of at least a portion of the spectral rays; and
   a waveguide, comprising:
   a first reflective surface; and
   a second reflective surface, wherein a waveguide space is formed between the first reflective surface and the second reflective surface, the optical signal is transmitted from the light input to the diffraction grating via the waveguide space, the at least a portion of the spectral rays is transmitted to the image sensor via the waveguide space;
   wherein at least one opening is formed on the waveguide, the at least one opening is located on at least one of the first reflective surface and the second reflective surface, and a portion of the spectral rays diffuses from the at least one opening out of the waveguide space without reaching the image sensor;
   wherein the waveguide further comprises at least one extension extending from an end of the waveguide beside the waveguide space toward the image sensor, so as to define a first opening of the at least one opening between the end and the image sensor; and
   wherein the extension abuts the image sensor to form the first opening between the end of the waveguide and the image sensor.

2. The spectrometer according to claim 1, wherein the waveguide device comprises:
   a first reflective mirror having the first reflective surface, and comprising a waveguide portion and the at least one extension connected to and extending out from the waveguide portion, wherein a light exit end of the waveguide portion facing a sensing surface of the image sensor defines the end of the waveguide space; and
   a second reflective mirror, having the second reflective surface, wherein the first reflective surface faces the second reflective mirror, and the second reflective surface faces the first reflective mirror.

3. The spectrometer according to claim 2, wherein distances between the image sensor and a plurality of spots on the light exit end of the waveguide portion are not completely identical.

4. The spectrometer according to claim 1, wherein the first opening tilts with respect to the sensing surface of the image sensor.

5. The spectrometer according to claim 1, wherein a width of the first opening along a direction of light transmission affects a moon shaped distribution of the at least a portion of the spectral rays, a width of the sensing surface of the image sensor along a direction parallel to a normal line of the first reflective surface affects an integral range of the image sensor, a divergence half angle of the optical signal incident the waveguide space from the light input along the direction parallel to the normal line of the first reflective surface affects an expansion of the moon shaped distribution, wherein by associating the width of the first opening along the direction of light transmission, the divergence half angle, and the width of the sensing surface along the direction parallel to the normal line of the first reflective surface, the width of the first opening allows the portion of at least one of the optical signal and the spectral rays to diffuse along the direction parallel to the normal line of the first reflective surface, so that two elongated portions of the moon shaped distribution derived from the divergence half angle substantially falls out of the integral range of the image sensor.

6. The spectrometer according to claim 1, wherein the width of the first opening along a direction of light transmission is larger than or equal to 1 mm.

7. The spectrometer according to claim 6, wherein the width of the first opening along the direction of light transmission falls within a range of 1 mm to 5 mm.

8. The spectrometer according to claim 1, wherein the at least one opening comprises a second opening completely enclosed by the waveguide disposed between the diffraction grating and the image sensor.

9. The spectrometer according to claim 1, further comprising a light capturing structure disposed outside of the waveguide space for absorbing lights diffused from the first opening.

* * * * *